United States Patent
Sato et al.

(10) Patent No.: US 11,860,438 B2
(45) Date of Patent: Jan. 2, 2024

(54) METHOD FOR MANUFACTURING INTERMITTENT CONNECTION-TYPE OPTICAL FIBER TAPE CORE WIRE AND INTERMITTENT CONNECTION-TYPE OPTICAL FIBER TAPE CORE WIRE

(71) Applicant: SUMITOMO ELECTRIC INDUSTRIES, LTD., Osaka (JP)

(72) Inventors: Fumiaki Sato, Osaka (JP); Keigo Yamamoto, Osaka (JP); Fumikazu Yoshizawa, Osaka (JP); Ken Takahashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/998,882

(22) PCT Filed: Jul. 28, 2021

(86) PCT No.: PCT/JP2021/027906
§ 371 (c)(1),
(2) Date: Nov. 15, 2022

(87) PCT Pub. No.: WO2022/025116
PCT Pub. Date: Feb. 3, 2022

(65) Prior Publication Data
US 2023/0213711 A1    Jul. 6, 2023

(30) Foreign Application Priority Data
Jul. 29, 2020    (JP) ................. 2020-128531

(51) Int. Cl.
*G02B 6/44* (2006.01)
*G02B 6/38* (2006.01)
*G02B 6/40* (2006.01)

(52) U.S. Cl.
CPC ........... *G02B 6/448* (2013.01); *G02B 6/3801* (2013.01); *G02B 6/40* (2013.01); *G02B 6/4403* (2013.01)

(58) Field of Classification Search
None
See application file for complete search history.

(56) References Cited

U.S. PATENT DOCUMENTS

2014/0314382 A1* 10/2014 Sato ..................... G02B 6/4434
385/103
2016/0161692 A1    6/2016 Namazue et al.
(Continued)

FOREIGN PATENT DOCUMENTS

JP    2004-206048 A    7/2004
JP    2012-208310 A    10/2012
(Continued)

OTHER PUBLICATIONS

International Search Report dated Oct. 12, 2021 issued in PCT/JP2021/027906.
Written Opinion dated Oct. 12, 2021 issued in PCT/JP2021/027906.

Primary Examiner — Jerry Rahll
(74) Attorney, Agent, or Firm — Pearne & Gordon LLP

(57) ABSTRACT

A method for manufacturing an intermittently coupled-type optical fiber ribbon includes arranging a plurality of optical fibers in parallel in a direction orthogonal to a longitudinal direction of the plurality of optical fibers, coating all of the plurality of optical fibers with a coupling resin, intermittently inserting a cleaving blade into the coupling resin between some adjacent optical fibers of the plurality of optical fibers to form slits. An outer diameter of each of the optical fibers is 220 μm or less. A distance between the
(Continued)

optical fibers into which the cleaving blade is inserted among the adjacent optical fibers is 10 μm or more and 100 μm or less.

9 Claims, 4 Drawing Sheets

(56) References Cited

U.S. PATENT DOCUMENTS

| | | |
|---|---|---|
| 2017/0090135 A1 | 3/2017 | Sato et al. |
| 2017/0115461 A1 | 4/2017 | Namazue et al. |
| 2017/0184803 A1 | 6/2017 | Namazue et al. |
| 2019/0285823 A1 | 9/2019 | Tanaka et al. |
| 2020/0064550 A1 | 2/2020 | Sato et al. |
| 2020/0218020 A1 | 7/2020 | Namazue et al. |

FOREIGN PATENT DOCUMENTS

| | | |
|---|---|---|
| JP | 2013-088617 A | 5/2013 |
| JP | 2013-167753 A | 8/2013 |
| JP | 2014-157382 A | 8/2014 |
| JP | 2016-146003 A | 8/2016 |
| JP | 2017-026754 A | 2/2017 |
| JP | 2017-062431 A | 3/2017 |
| JP | 2020-076916 A | 5/2020 |
| WO | 2004-042446 A1 | 5/2004 |
| WO | 2018-105424 A1 | 6/2018 |
| WO | 2018-117068 A1 | 6/2018 |
| WO | 2019-011418 A1 | 1/2019 |

\* cited by examiner

METHOD FOR MANUFACTURING INTERMITTENT CONNECTION-TYPE OPTICAL FIBER TAPE CORE WIRE AND INTERMITTENT CONNECTION-TYPE OPTICAL FIBER TAPE CORE WIRE

TECHNICAL FIELD

The present disclosure relates to a method for manufacturing an intermittently coupled-type optical fiber ribbon and an intermittently coupled-type optical fiber ribbon.

The present application claims priority from Japanese Patent Application No. 2020-128531 filed on Jul. 29, 2020, contents of which are incorporated by reference in its entirety.

BACKGROUND ART

In the related art, as an example of a method for manufacturing an intermittently coupled-type optical fiber ribbon, there is a method of arranging a plurality of optical fibers in parallel in a direction orthogonal to a longitudinal direction of the plurality of optical fibers, coating all of the plurality of arranged optical fibers with a resin, and intermittently inserting a cleaving blade between some adjacent coated optical fibers to form slits (non-coupling portions) (for example, Patent Literatures 1 and 4). Further, Patent Literatures 2 and 3 describe a distance between optical fibers (center-to-center distance) of a ribbon having an intermittent structure.

CITATION LIST

Patent Literature

Patent Literature 1: JP2004-206048A
Patent Literature 2: JP2014-157382A
Patent Literature 3: JP2013-088617A
Patent Literature 4: JP2012-208310A

SUMMARY OF INVENTION

A method for manufacturing an intermittently coupled-type optical fiber ribbon of the present disclosure includes:
  arranging a plurality of optical fibers in parallel in a direction orthogonal to a longitudinal direction of the plurality of optical fibers;
  coating all of the plurality of optical fibers with a coupling resin; and
  intermittently inserting a cleaving blade into the coupling resin between some adjacent optical fibers of the plurality of optical fibers to form slits, in which
  an outer diameter of each of the optical fibers is 220 μm or less, and
  a distance between the optical fibers into which the cleaving blade is inserted among the adjacent optical fibers is 10 μm or more and 100 μm or less.

An intermittently coupled-type optical fiber ribbon according to the present disclosure includes:
  a plurality of optical fibers arranged in parallel in a direction orthogonal to a longitudinal direction of the plurality of optical fibers; and
  a coupling resin coating all of the plurality of optical fibers, in which
  slits are formed by intermittently inserting a cleaving blade into the coupling resin between some adjacent optical fibers of the plurality of optical fibers,
  an outer diameter of each of the optical fibers is 220 μm or less, and
  a distance between the optical fibers into which the cleaving blade is inserted among the adjacent optical fibers is 10 μm or more and 100 μm or less.

DESCRIPTION OF EMBODIMENTS

[Technical Problem]

Figure 1:
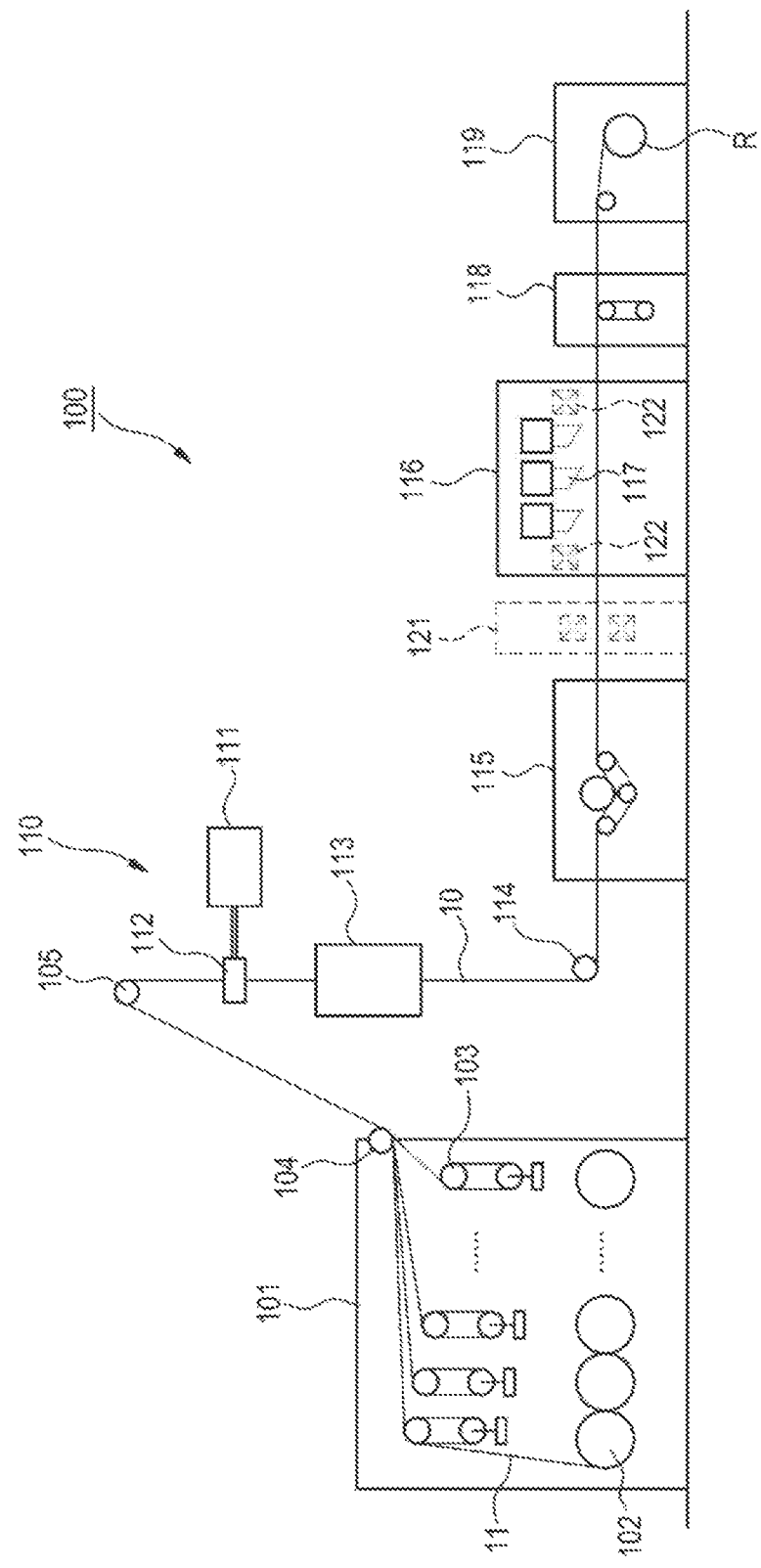
FIG. 1 is a configuration diagram of a manufacturing device of an intermittently coupled-type optical fiber ribbon according to a first embodiment of the present disclosure.

In order to densely mount a plurality of optical fiber ribbons in a cable, it is preferable to arrange each optical fiber such that a distance between adjacent optical fibers is as small as possible in each optical fiber ribbon. However, when the distance is too small, the optical fibers may be damaged by a cleaving blade in the case of forming a slit.

For example, when a thin optical fiber having an outer diameter of 200 μm is used in an optical fiber ribbon, in general, a coating layer of the thin optical fiber is thin, and a distance between adjacent thin optical fibers is small, and thus when an insertion position of the cleaving blade deviates even slightly in the case of forming a slit, the thin optical fiber may be externally damaged.

Therefore, the present disclosure provides a method for manufacturing an intermittently coupled-type optical fiber ribbon and an intermittently coupled-type optical fiber ribbon that can be densely mounted while preventing an external damage to an optical fiber.

(Description of Aspect of Present Disclosure)

First, embodiments of the present disclosure will be listed and described.

(1) A method for manufacturing an intermittently coupled-type optical fiber ribbon according to an aspect of the present disclosure includes:
  arranging a plurality of optical fibers in parallel in a direction orthogonal to a longitudinal direction of the plurality of optical fibers;
  coating all of the plurality of optical fibers with a coupling resin; and
  intermittently inserting a cleaving blade into the coupling resin between some adjacent optical fibers of the plurality of optical fibers to form slits, in which
  an outer diameter of each of the optical fibers is 220 μm or less, and
  a distance between the optical fibers into which the cleaving blade is inserted among the adjacent optical fibers is 10 μm or more and 100 μm or less.

According to the method for manufacturing an intermittently coupled-type optical fiber ribbon of the present disclosure, since the distance between the optical fibers into which the cleaving blade is inserted among the adjacent optical fibers is 10 μm or more, even when the cleaving blade is inserted, the optical fibers are not damaged. In addition, since the distance between the optical fibers into which the cleaving blade is inserted is 100 μm or less, the plurality of optical fibers can be densely arranged on the ribbon.

(2) A breaking strength of the coupling resin may be more than 20 MPa and 50 MPa or less.

When the breaking strength of the coupling resin is too low, in the case where the intermittently coupled-type optical fiber ribbon is squeezed by a roller of a line during the manufacturing process, since the coupling resin is too soft, the optical fibers may be separated within the ribbon. However, according to the present disclosure, since the breaking strength of the coupling resin is more than 20 MPa, separation of the optical fibers due to a low breaking strength is less likely to occur. In addition, since the breaking strength of the coupling resin is 50 MPa or less, the coupling resin is not too hard, and the coupling resin can be easily broken by the cleaving blade.

(3) A Young's modulus of an outermost layer of each of the optical fibers may be 800 MPa or more and 2000 MPa or less.

According to the present disclosure, since a Young's modulus of a coating layer of the outermost layer of each optical fiber is 800 MPa or more, the optical fiber is less likely to be externally damaged by the cleaving blade. In addition, since the Young's modulus of the coating layer of the outermost layer of each optical fiber is 2000 MPa or less, it is not difficult to cause the intermittently coupled-type optical fiber ribbon to deform due to a rigidity of the resin, and a cable loss characteristic does not deteriorate.

(4) The cleaving blade may be inserted after the coupling resin is cured with a gel fraction of 90% or more.

When the cleaving blade is inserted while the coupling resin is not cured, since the coupling resin is highly elastic, it is difficult to break the coupling resin by the cleaving blade, and since the strength is low, separation of the optical fibers within the ribbon may occur. According to the present disclosure, since the cleaving blade is inserted after the coupling resin is cured with a gel fraction of 90% or more, the coupling resin can be easily broken by the cleaving blade, and the optical fibers are not separated within the ribbon.

(5) The coupling resin coating the plurality of optical fibers is cured,
  the cured coupling resin is heated and softened, and
  the cleaving blade may be inserted into the softened coupling resin.

When the cleaving blade is inserted while the coupling resin is not softened, the coupling resin cannot be easily broken, and the coupling resin may be peeled off from the plurality of optical fibers in the case of forming a slit. According to the present disclosure, since the cleaving blade is inserted into the softened coupling resin, the coupling resin can be easily broken.

(6) The coupling resin coating the plurality of optical fibers is cured,
  the cleaving blade is heated, and
  the heated cleaving blade may be inserted into the cured coupling resin.

According to the present disclosure, even when the coupling resin is cured and in a hard state, since the cleaving blade is inserted into the coupling resin in a heated state of the cleaving blade, the coupling resin can be easily broken.

(7) A surface of each of the optical fibers is marked, and
  the plurality of marked optical fibers may be coated with the coupling resin.

According to the present disclosure, since the surface of each optical fiber is marked, identification of the ribbon can be enhanced.

(8) An intermittently coupled-type optical fiber ribbon according to an aspect of the present disclosure includes:
  a plurality of optical fibers arranged in parallel in a direction orthogonal to a longitudinal direction of the plurality of optical fibers; and
  a coupling resin coating all of the plurality of optical fibers, in which
  slits are formed by intermittently inserting a cleaving blade into the coupling resin between some adjacent optical fibers of the plurality of optical fibers,
  an outer diameter of each of the optical fibers is 220 μm or less, and
  a distance between the optical fibers into which the cleaving blade is inserted among the adjacent optical fibers is 10 μm or more and 100 μm or less.

According to the intermittently coupled-type optical fiber ribbon of the present disclosure, since the distance between the optical fibers into which the cleaving blade is inserted among the adjacent optical fibers is 10 μm or more, even when the cleaving blade is inserted, the optical fibers are not damaged. In addition, since the distance between the optical fibers into which the cleaving blade is inserted is 100 μm or less, the plurality of optical fibers can be densely arranged on the ribbon.

(9) A breaking strength of the coupling resin may be more than 20 MPa and 50 MPa or less.

When the breaking strength of the coupling resin is too low, in the case where the intermittently coupled-type optical fiber ribbon is squeezed by a roller of a line during the manufacturing process, since the coupling resin is too soft, the optical fibers may be separated within the ribbon. However, according to the present disclosure, since the breaking strength of the coupling resin is more than 20 MPa, separation of the optical fibers due to a low breaking strength is less likely to occur. In addition, since the breaking strength of the coupling resin is 50 MPa or less, the coupling resin is not too hard, and the coupling resin can be easily broken by the cleaving blade.

(10) A Young's modulus of an outermost layer of each of the optical fibers may be 800 MPa or more and 2000 MPa or less.

According to the present disclosure, since a Young's modulus of a coating layer of the outermost layer of each optical fiber is 800 MPa or more, the optical fiber is less likely to be externally damaged by the cleaving blade. In addition, since the Young's modulus of the coating layer of the outermost layer of each optical fiber is 2000 MPa or less, it is not difficult to cause the intermittently coupled-type optical fiber ribbon to deform due to a rigidity of the resin, and a cable loss characteristic does not deteriorate.

[Advantageous Effects of Invention]

According to the present disclosure, a method for manufacturing an intermittently coupled-type optical fiber ribbon and an intermittently coupled-type optical fiber ribbon that can be densely mounted while preventing an external damage to an optical fiber are provided.

(Details of First Embodiment of Present Disclosure)

An intermittently coupled-type optical fiber ribbon 1 and a method for manufacturing the intermittently coupled-type optical fiber ribbon 1 according to an aspect of the present disclosure will be described with reference to the drawings.

The present disclosure is not limited to these examples and is defined by the scope of the claims, and is intended to include all modifications within the scope and meaning equivalent to the scope of the claims.

FIG. 1 is a configuration diagram of a manufacturing device 100 of the intermittently coupled-type optical fiber ribbon 1 according to an aspect of the present disclosure. As shown in FIG. 1, the manufacturing device 100 includes a supply 101, a coating device 110, a feeding capstan 115, a cutting device 116, a winding-up tension control dancer 118, and a winding-up device 119. Further, the manufacturing device 100 includes a fiber assembling roller 105 provided between the supply 101 and the coating device 110, and a turn roller 114 provided between the coating device 110 and the feeding capstan 115.

The supply 101 includes a plurality of reels 102, a dancer roller 103, and a conveying roller 104. Optical fibers 11 are wrapped around the plurality of reels 102. An outer diameter of each of the optical fibers 11 is, for example, 220 µm or less. The plurality of optical fibers 11 are drawn out from the plurality of reels 102, and a predetermined tension is applied to the plurality of optical fibers 11 by the dancer roller 103. Thereafter, the plurality of optical fibers 11 are arranged on an array surface in the case of passing through the conveying roller 104 and sent to the fiber assembling roller 105.

A plurality of groove portions (not shown) through which the plurality of optical fibers 11 pass are arranged at predetermined intervals on the fiber assembling roller 105. As a result, the plurality of optical fibers 11 are assembled and arranged in parallel in a direction orthogonal to a longitudinal direction of the optical fibers 11.

The plurality of optical fibers 11 assembled on the fiber assembling roller 105 are sent to the coating device 110. The coating device 110 includes a resin storage tank 111, an applying device 112, and an ultraviolet irradiation device 113.

Figure 2:
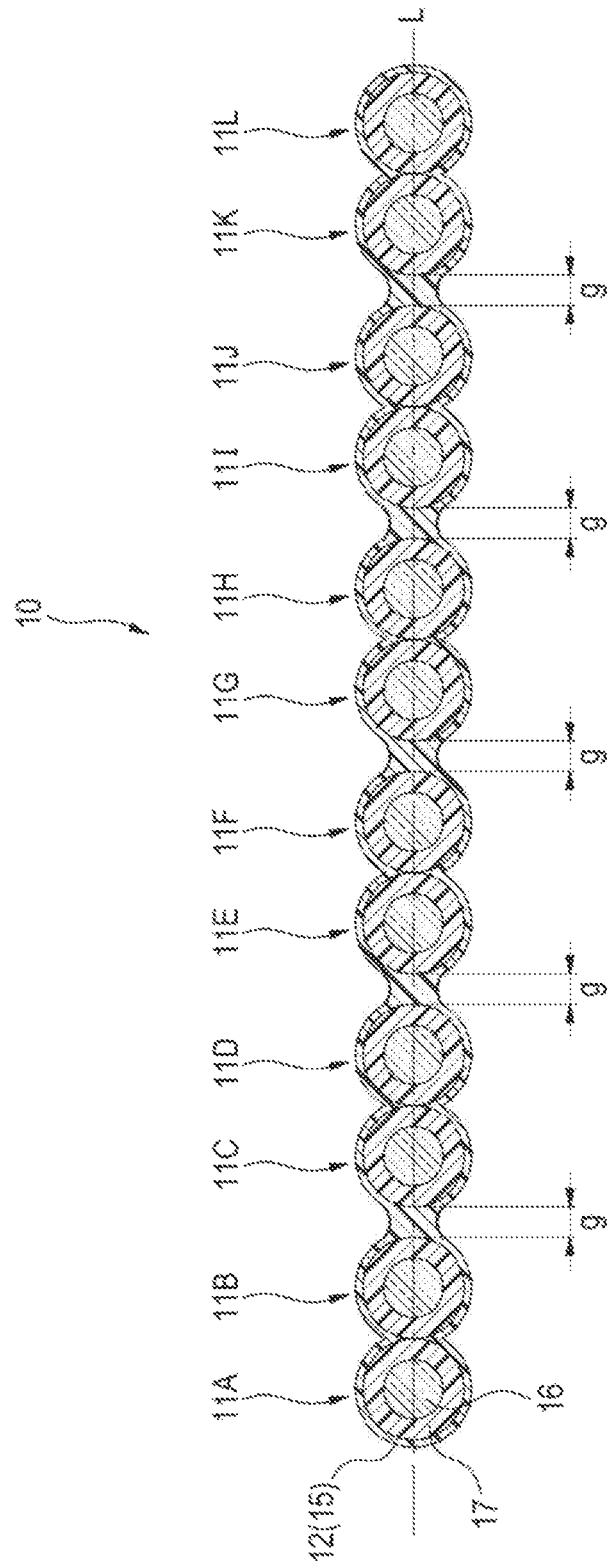
FIG. 2 is a cross-sectional view perpendicular to a longitudinal direction of the optical fiber ribbon manufactured by the manufacturing device of FIG. 1.

The applying device 112 penetrates all the optical fibers 11 and coats, around the optical fibers 11, a coupling resin 15 supplied from the resin storage tank 111 to form a coating layer 12 (see FIG. 2). The coupling resin 15 is preferably an ultraviolet curable resin, and may be a thermoplastic resin, an adhesive resin, or other coating resins. The ultraviolet irradiation device 113 cures the coupling resin 15 by emitting ultraviolet rays. As a result, the plurality of optical fibers 11 are formed into an optical fiber ribbon 10.

The optical fiber ribbon 10 is sent to the feeding capstan 115 via the turn roller 114. Thereafter, slits are formed in the optical fiber ribbon 10 by the cutting device 116.

The cutting device 116 includes a plurality of cleaving blades 117. Each cleaving blade 117 has a tapered tip and a blade thickness of 0.2 mm, for example. A cam mechanism is coupled to each cleaving blade 117, and the cleaving blade 117 is provided along a longitudinal direction of the optical fiber ribbon 10 and is configured to swing in conjunction with the cam mechanism. Slits are formed by intermittently inserting the cleaving blade 117 into the coupling resin 15 between some adjacent optical fibers of the optical fiber ribbon 10 by the swinging movement of the cleaving blade 117. The cleaving blade 117 is preferably inserted in a state in which the coupling resin 15 is cured to a gel fraction of 90% or more. The optical fiber ribbon 10 in which the slits are intermittently formed is formed into the intermittently coupled-type optical fiber ribbon 1.

The intermittently coupled-type optical fiber ribbon 1 is sent to the winding-up tension control dancer 118 to control a tension. Thereafter, the intermittently coupled-type optical fiber ribbon 1 is wound up onto a winding-up reel R by the winding-up device 119.

Next, details of a process of manufacturing the intermittently coupled-type optical fiber ribbon 1 from the optical fiber ribbon 10 will be described. FIG. 2 shows a cross-sectional view perpendicular to the longitudinal direction of the optical fiber ribbon 10. As shown in FIG. 2, in the optical fiber ribbon 10, a periphery of each of a plurality of optical fibers 11A to 11L (12 cores in this example) arranged in parallel in a direction orthogonal to the longitudinal direction is coated with the coating layer 12. A breaking strength of the coupling resin 15 forming the coating layer 12 is more than 20 MPa and 50 MPa or less. Each of the optical fibers 11A to 11L includes a glass fiber 16 in the center and an outer layer 17 (outermost layer) covering a periphery of the glass fiber 16. A diameter of the glass fiber 16 is, for example, 200 µm, and a thickness of the outer layer 17 is 37.5 µm. A Young's modulus of the outer layer 17 is 800 MPa or more and 2000 MPa or less.

In this example, two optical fibers are substantially in contact with each other to form an optical fiber set, and an interval of distance g is provided between adjacent optical fiber sets. In FIG. 2, the interval of distance g is provided between a set of the optical fibers 11A and 11B and a set of the optical fibers 11C and 11D, between a set of the optical fibers 11C and 11D and a set of the optical fibers 11E and 11F, between a set of the optical fibers 11E and 11F and a set of the optical fibers 11G and 11H, between a set of the optical fibers 11G and 11H and a set of the optical fibers 11I and 11J, and between a set of the optical fibers 11I and 11J and a set of the optical fibers 11L and 11L. It should be noted that the interval of distance g is provided for every two optical fibers in this example, but the interval of distance g may be provided for each optical fiber.

The distance g is a distance between the outer layer 17 of an optical fiber (11B) and the outer layer 17 of an adjacent optical fiber (11C) on a straight line L which is along a parallel arrangement direction of the plurality of optical fibers 11A to 11L, and passes through centers of the optical fibers, the optical fiber (11B) being near an adjacent optical fiber set (for example, 11C and 11D) in a set of optical fibers (for example, 11A and 11B). In this example, the distance g is 10 µm or more and 100 µm or less. In this example, a slit is formed by inserting the cleaving blade 117 into a portion of the coupling resin 15 where the interval of distance g is provided. As a result, the slit is formed into a non-coupling portion 14 (see FIG. 3) of the intermittently coupled-type optical fiber ribbon 1.

Figure 3:
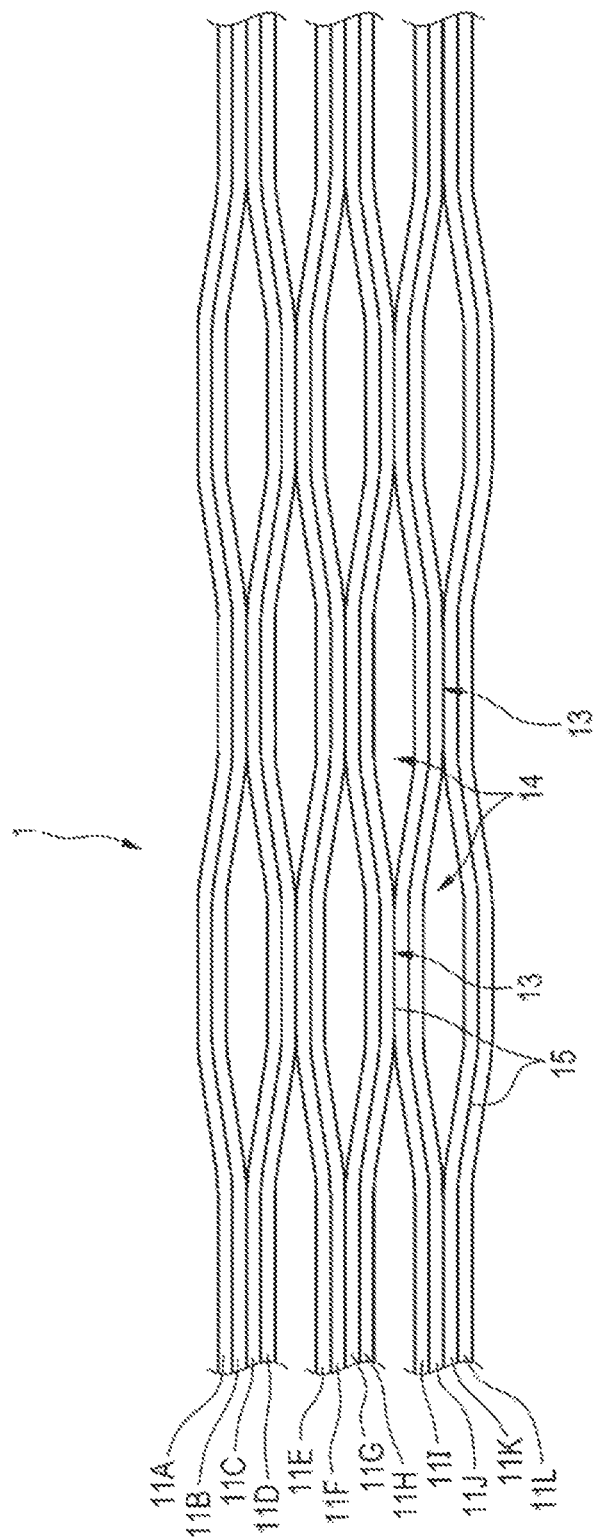
FIG. 3 is a partially developed view showing the intermittently coupled-type optical fiber ribbon in a longitudinal direction.

FIG. 3 is a partially developed view showing the intermittently coupled-type optical fiber ribbon 1 in a longitudinal direction thereof. As shown in FIG. 3, the optical fiber ribbon 10 that has passed through the cutting device 116 is formed into the intermittently coupled-type optical fiber ribbon 1. In the intermittently coupled-type optical fiber ribbon 1, a coupling portion 13 in which adjacent optical fibers are coupled and the non-coupling portion 14 in which adjacent optical fibers are not coupled are intermittently provided in the longitudinal direction on some or all of the plurality of optical fibers 11A to 11L in a state of being arranged in parallel in a direction orthogonal to a longitudinal direction of the plurality of optical fibers 11A to 11L. In this manner, the optical fiber ribbon 10 sent to the cutting device 116 is formed into the intermittently coupled-type optical fiber ribbon 1 by intermittently inserting the cleaving blade 117.

As described above, in the optical fiber ribbon 10 of this example, the optical fibers 11 are arranged so that the distance g is 10 µm or more and 100 µm or less, and the coupling resin 15 is cured. In general, when the distance g is too small, the glass fiber 16 may be damaged by the cleaving blade 117 in the case of inserting the cleaving blade 117. When the distance g is too large, the plurality of optical fibers 11 cannot be densely arranged as the optical fiber ribbon 10. However, according to this example, since the distance g is 10 µm or more, even when the cleaving blade 117 is inserted, a risk of damaging the optical fibers 11 is reduced. Further, since the distance g is 100 µm or less, the plurality of optical fibers 11 can be densely arranged as the optical fiber ribbon 10. Therefore, it is possible to provide the intermittently coupled-type optical fiber ribbon 1 in which the optical fibers 11 are densely arranged while reducing a possibility of an external damage to each optical fiber 11.

The breaking strength of the coupling resin 15 is preferably neither too low nor too high. When the breaking strength is too low, for example, in the case where the optical fiber ribbon 10 is squeezed by the turn roller 114, since the coupling resin 15 is too soft, the plurality of optical fibers 11 in the optical fiber ribbon 10 may be separated. Conversely, when the breaking strength is too high, since the coupling resin 15 is too hard, it is difficult to break the coupling resin 15 by the cleaving blade 117. In the optical fiber ribbon 10 of this example, since the breaking strength of the coupling resin 15 is more than 20 MPa, separation of the optical fibers 11 due to a low breaking strength is less likely to occur. In addition, since the breaking strength of the coupling resin 15 is 50 MPa or less, the coupling resin 15 is not too hard, and the coupling resin 15 can be easily broken by the cleaving blade 117. Therefore, it is possible to easily form the slit, that is, the non-coupling portion 14 while preventing the separation of the optical fibers 11.

When the Young's modulus of the outer layer 17 is too low (the outer layer 17 is too soft), the glass fiber 16 may be damaged by the cleaving blade 117 in the case of inserting the cleaving blade 117. Meanwhile, when the Young's modulus of the outer layer 17 is too high (the outer layer 17 is too hard), it is difficult to cause the intermittently coupled-type optical fiber ribbon to deform due to a rigidity of the resin, and a cable loss characteristic may deteriorate. However, since the Young's modulus of the outer layer 17 of each optical fiber 11 in this example is 800 MPa or more, the outer layer 17 is less likely to be externally damaged by the cleaving blade 117. In addition, since the Young's modulus of the outer layer 17 is 2000 MPa or less, it is not difficult to cause the intermittently coupled-type optical fiber ribbon 1 to deform due to a rigidity of the resin, and a possibility of deterioration in cable loss characteristic can be reduced. Therefore, it is possible to provide the intermittently coupled-type optical fiber ribbon 1 that prevents an external damage to the outer layer 17 and has a good cable loss characteristic.

[Description]

The cleaving blade 117 is inserted into the coupling resin 15 to form a slit after the coupling resin 15 is cured to a predetermined value or more. When the cleaving blade 117 is inserted while the coupling resin 15 is not cured, since the coupling resin 15 is highly elastic, it is difficult to break the coupling resin 15. In addition, when the coupling resin 15 is not cured, since the strength is low, and the plurality of optical fibers 11 in the optical fiber ribbon 10 may be separated. In the optical fiber ribbon 10 of this example, since the cleaving blade 117 is inserted into the coupling resin 15 to form a slit after the coupling resin 15 is cured to a gel fraction of 90% or more, the coupling resin 15 can be easily broken by the cleaving blade 117, and separation of the optical fibers 11 within the ribbon can also be prevented.

It should be noted that in this example, the manufacturing process is described as forming the intermittently coupled-type optical fiber ribbon 1 by intermittently inserting the cleaving blade 117 of the cutting device 116 into the optical fiber ribbon 10 as it is in which the coupling resin 15 is cured by the coating device 110, but the manufacturing process is not limited to this. For example, the manufacturing device 100 may include a first heating unit 121 (FIG. 1) that heats the coupling resin 15 between the coating device 110 and the cutting device 116. In the optical fiber ribbon 10 in which the coupling resin 15 is cured by passing through the ultraviolet irradiation device 113 of the coating device 110, the coupling resin 15 is heated and softened by the first heating unit 121. A slit is formed by inserting the cleaving blade 117 into the softened coupling resin 15.

When the cleaving blade 117 is inserted while the coupling resin 15 is not softened, the coupling resin 15 cannot be easily broken. In addition, the coupling resin 15 may be peeled off from the plurality of optical fibers 11 in the case of forming a slit. According to this example, since the cleaving blade 117 is inserted into the coupling resin 15 softened by the first heating unit 121, the coupling resin 15 can be easily broken. It should be noted that a temperature heated by the first heating unit 121 is preferably about 40° C. or higher. When the heated temperature is about 40° C., an effect of softening the coupling resin 15 is observed. However, the heated temperature needs to be equal to or lower than a melting point of the coupling resin 15, and specifically, the heated temperature is preferably about 95° C. or lower.

In addition, the cutting device 116 of the manufacturing device 100 may include a second heating unit 122 that heats the cleaving blade 117 (FIG. 1). The optical fiber ribbon 10 in which the coupling resin 15 is cured by passing through the ultraviolet irradiation device 113 of the coating device 110 is sent to the cutting device 116. The cleaving blade 117 heated by the second heating unit 122 is inserted into the cured coupling resin 15 to form a slit. Therefore, according to this example, even when the coupling resin 15 is cured, since the cleaving blade 117 is inserted into the coupling resin 15 in a heated state of the cleaving blade 117, the coupling resin 15 can be easily broken. Also in this example, a temperature heated by the second heating unit 122 is preferably about 40° C. or higher and about 95° C. or lower. It should be noted that both the first heating unit 121 and the second heating unit 122 may be provided to respectively heat both the coupling resin 15 and the cleaving blade 117.

(Modifications)

Figure 4:
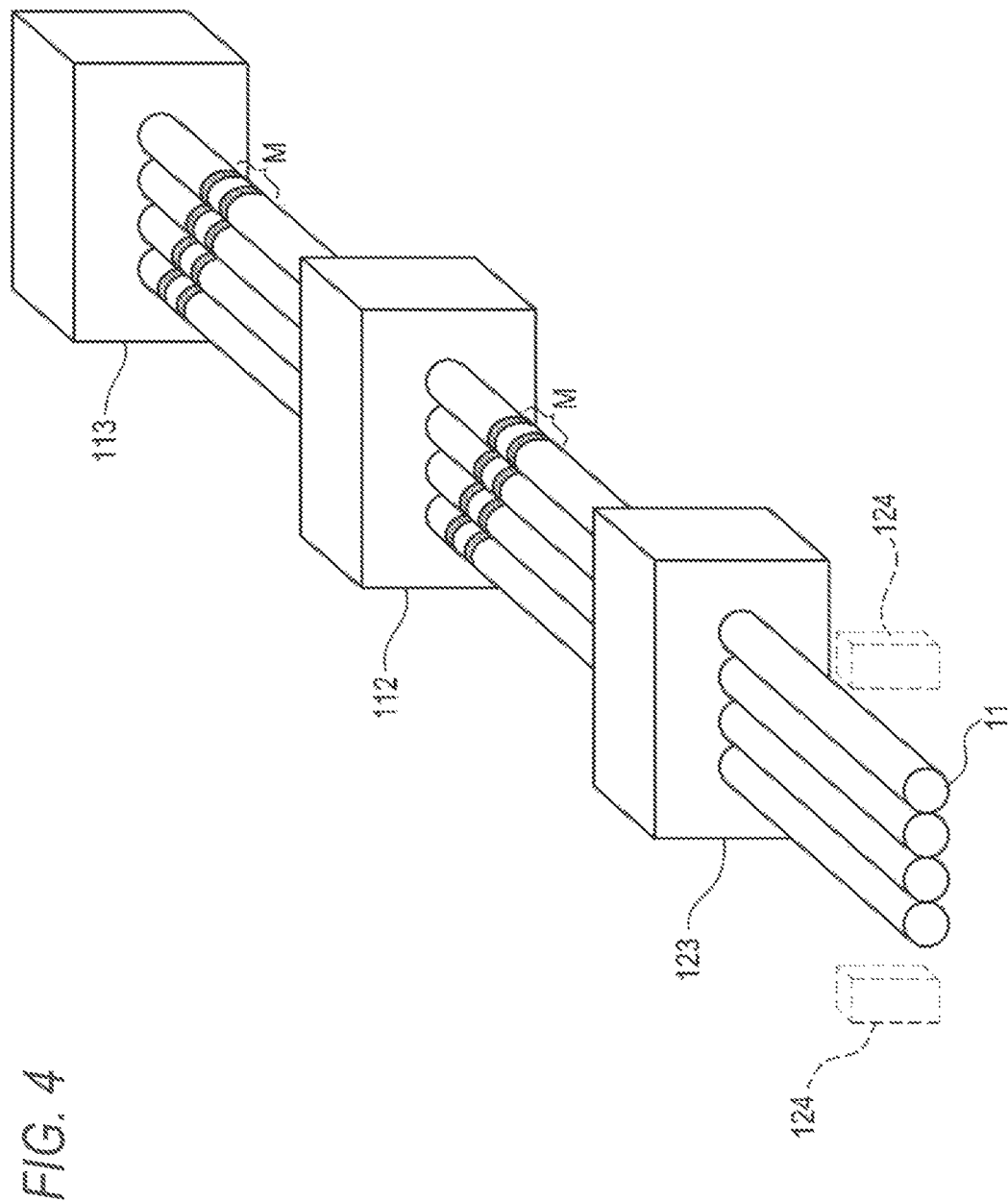
FIG. 4 is a schematic diagram of a printing device used in a modification of the manufacturing device of an intermittently coupled-type optical fiber ribbon.

The manufacturing device 100 of this example may mark the plurality of optical fibers 11 with a mark M in order to enhance identification of the intermittently coupled-type optical fiber ribbon 1. FIG. 4 is a schematic diagram of a printing device 123 that can be provided on the manufacturing device 100 of the intermittently coupled-type optical fiber ribbon 1.

As shown in FIG. 4, the manufacturing device 100 may include the printing device 123 that marks surfaces of the plurality of optical fibers 11, in addition to the configuration shown in FIG. 1. The printing device 123 may be disposed between the supply 101 and the coating device 110, and preferably provided between the fiber assembling roller 105 and the coating device 110. The printing device 123 is, for example, an inkjet printer.

The printing device 123 forms the mark M by printing markings on the surfaces of the plurality of optical fibers 11 sent from the supply 101. A shape of the mark M may be, for example, a bar shape orthogonal to the longitudinal direction. In addition, each of the optical fibers 11 may be provided with a ring-shaped ring mark.

The plurality of optical fibers 11 having the mark M formed thereon are then sent to the applying device 112. The applying device 112 applies the coupling resin 15 onto the mark M, and the ultraviolet irradiation device 113 cures the coupling resin 15 including the mark M. Since subsequent manufacturing processes overlap with the manufacturing processes described in FIG. 1, illustration and description thereof will be omitted.

As described above, according to this example, since the surfaces of the optical fibers 11 are marked by the printing device 123, the identification of the ribbon can be enhanced.

It should be noted that the manufacturing device 100 of this example may include a plasma processing device 124 that performs plasma processing on the surfaces of the plurality of optical fibers 11. The plasma processing device 124 may be disposed between the supply 101 and the printing device 123, and preferably provided between the fiber assembling roller 105 and the printing device 123. The plasma processing by the plasma processing device 124 enhances a wettability of the surface of each optical fiber and improves a degree of adhesion of a marking material to the surface of the optical fiber. Therefore, it is possible to prevent the mark M from peeling off from the surface of the optical fiber when the mark M is marked by the printing device 123 thereafter.

(Evaluation Experiments)

An optical fiber cable manufactured by the manufacturing method of the present disclosure was evaluated. The optical fiber cable used in this evaluation experiment is a 432-core slotless type optical fiber cable in which 12-core intermittently coupled-type optical fiber ribbon 1 is mounted. An outer diameter of the cable is 11 mm and a core density is 4.55 cores/mm$^2$. The distance g of the intermittently coupled-type optical fiber ribbon 1 mounted on each optical fiber cable, the breaking strength of the coupling resin 15 at 23° C., and the Young's modulus of the outer layer at 23° C. are individually set, and Sample Nos. 1 to 12 were prepared. In this evaluation experiment, presence or absence of an external damage to the optical fiber 11 of each sample, a possibility of cleaving, presence or absence of separation at the time of cleaving, and a cable loss characteristic were evaluated. The cable loss characteristic was evaluated by determining whether an attenuation per unit distance is less than 0.3 dB/km when a wavelength of 1.55 μm is incident on the cable. Evaluation results are shown in Table 1.

TABLE 1

| Sample No. | Distance g (μm) | Breaking strength of coupling resin (MPa) | Young's modulus of outer layer (MPa) | Presence or absence of external damage | Cleavable | Presence or absence of separation at time of cleaving | Cable loss characteristic |
|---|---|---|---|---|---|---|---|
| 1 | 0 | 30 | 800 | Presence | Yes | Absence | Less than 0.3 dB/km |
| 2 | 0 | 50 | 800 | Presence | Yes | Absence | Less than 0.3 dB/km |
| 3 | 0 | 70 | 800 | Presence | Yes | Absence | Less than 0.3 dB/km |
| 4 | 10 | 20 | 800 | Absence | Yes | Presence | Less than 0.3 dB/km |
| 5 | 10 | 30 | 800 | Absence | Yes | Absence | Less than 0.3 dB/km |
| 6 | 10 | 50 | 800 | Absence | Yes | Absence | Less than 0.3 dB/km |
| 7 | 10 | 50 | 2000 | Absence | Yes | Absence | Less than 0.3 dB/km |
| 8 | 10 | 50 | 2500 | Absence | Yes | Absence | 0.3 dB/km or more |
| 9 | 10 | 70 | 800 | Absence | No | Absence | Less than 0.3 dB/km |
| 10 | 100 | 30 | 600 | Presence | Yes | Absence | Less than 0.3 dB/km |
| 11 | 100 | 30 | 800 | Absence | Yes | Absence | Less than 0.3 dB/km |
| 12 | 100 | 50 | 800 | Absence | Yes | Absence | Less than 0.3 dB/km |
| 13 | 100 | 70 | 800 | Absence | No | Absence | Less than 0.3 dB/km |
| 14 | 150 | 30 | 800 | Absence | Yes | Absence | 0.3 dB/km or more |
| 15 | 150 | 50 | 800 | Absence | Yes | Absence | 0.3 dB/km or more |

In Table 1, for each of Sample Nos. 1 to 3, the distance g is 0 μm, and an external damage to the optical fiber was confirmed. This is because the optical fiber is damaged by the cleaving blade 117 since the distance g is too small. In addition, an external damage to the optical fiber was also confirmed in Sample No. 10 in which the Young's modulus of the outer layer is 600 MPa. This is because the optical fiber is damaged by the cleaving blade 117 since the Young's modulus of the outer layer is too small. No external damage to the optical fiber was confirmed in other Sample Nos. 4-9 and 11-15. Accordingly, it was confirmed that when the distance g is 10 μm or more and the Young's modulus of the outer layer is 800 MPa or more, the external damage to the optical fiber can be prevented.

In Table 1, for each of Sample No. 9 and 13, the breaking strength of the coupling resin 15 is 70 MPa, and it was confirmed that the coupling resin 15 cannot be cleaved by the cleaving blade 117 (an uncut portion is formed). This is because the coupling resin 15 is too hard. Meanwhile, cleaving by the cleaving blade 117 was confirmed in other Sample Nos. 1-8, 10-12, 14 and 15 in which the breaking strength of the coupling resin 15 is 50 MPa or less. Accordingly, it was confirmed that when the breaking strength of the coupling resin 15 is 50 MPa or less, the coupling resin 15 can be cleaved by the cleaving blade 117.

Further, the optical fiber was separated at the time of cleaving in Sample No. 4 in which the breaking strength of the coupling resin 15 is 20 MPa. No separation was confirmed in other samples. Accordingly, it was confirmed that when the breaking strength of the coupling resin 15 is more than 20 MPa, the optical fiber can be prevented from being separated at the time of cleaving.

In Table 1, for each of Sample Nos. 14 and 15, the distance g was 150 and an attenuation of 0.3 dB/km or more was confirmed as a cable loss characteristic. When the distance g is too long, optical fibers in the optical fiber of the same opitcal fiber ribbon cannot be densely mounted in the cable. That is, since a cross-sectional area per intermittently coupled-type optical fiber ribbon increases, the optical fibers in the cable are mounted without any gap such that lateral pressure is applied to each other. This lateral pressure increases the cable loss characteristic. In addition, in Sample No. 8 in which the Young's modulus of the outer layer is 2500 MPa, since it is difficult to cause the intermittently coupled-type optical fiber ribbon to deform due to a rigidity of the resin, an attenuation of 0.3 dB/km or more was confirmed as a cable loss characteristic. The cable loss characteristic was less than 0.3 dB/km in other Sample Nos. 1-7 and 9-13 in which the distance g is 100 μm or less. In particular, the cable loss characteristic was also less than 0.3 dB/km in Sample No. 7 in which the distance g is 100 μm or less, and the Young's modulus of the outer layer is 2000 MPa. Accordingly, it was confirmed that when the distance g is 100 μm or less and the Young's modulus of the outer layer is 2000 MPa or less, an optical fiber cable having a low cable loss characteristic can be achieved while optical fibers are densely mounted in the cable.

Although the present disclosure has been described in detail with reference to a specific embodiment, it will be apparent to those skilled in the art that various changes and modifications can be made without departing from the spirit and scope of the present disclosure. The numbers, positions, shapes, and the like of components described above are not limited to the embodiments described above and can be changed to suitable numbers, positions, shapes, and the like on a premise that the present disclosure is achieved.

REFERENCE SIGNS LIST

1: intermittently coupled-type optical fiber ribbon
10: optical fiber ribbon
11, 11A to 11L: optical fiber
12: coating layer
13: coupling portion
14: non-coupling portion
15: coupling resin
16: glass fiber
17: outer layer (outermost layer)
100: manufacturing device
101: supply
102: reel
103: dancer roller
104: conveying roller
105: fiber assembling roller
110: coating device
111: resin storage tank
112: applying device
113: ultraviolet irradiation device
114: turn roller
115: feeding capstan
116: cutting device
117: cleaving blade
118: winding-up tension control dancer
119: winding-up device
121: first heating unit
122: second heating unit
123: printing device
124: plasma processing device
R: winding-up reel
M: mark

What is claimed is:

1. A method for manufacturing an intermittently coupled-type optical fiber ribbon, comprising:
   arranging a plurality of optical fibers in parallel in a direction orthogonal to a longitudinal direction of the plurality of optical fibers;
   coating all of the plurality of optical fibers with a coupling resin; and
   intermittently inserting a cleaving blade into the coupling resin between some adjacent optical fibers of the plurality of optical fibers to form slits, wherein
   an outer diameter of each of the optical fibers is 220 μm or less,
   a distance between the optical fibers into which the cleaving blade is inserted among the adjacent optical fibers is 10 μm or more and 100 μm or less, and
   the method further comprises inserting the cleaving blade after the coupling resin is cured with a gel fraction of 90% or more.

2. The method for manufacturing the intermittently coupled-type optical fiber ribbon according to claim 1, wherein
   a breaking strength of the coupling resin is 20 Mpa or more and 50 MPa or less.

3. The method for manufacturing the intermittently coupled-type optical fiber ribbon according to claim 1, wherein
   a Young's modulus of an outermost layer of each of the optical fibers is 800 MPa or more and 2000 MPa or less.

4. The method for manufacturing the intermittently coupled-type optical fiber ribbon according to claim 1, further comprising:
   curing the coupling resin coating the plurality of optical fibers;
   heating and softening the cured coupling resin; and
   inserting the cleaving blade into the softened coupling resin.

5. The method for manufacturing the intermittently coupled-type optical fiber ribbon according to claim 1, further comprising:
   curing the coupling resin coating the plurality of optical fibers;
   heating the cleaving blade; and
   inserting the heated cleaving blade into the cured coupling resin.

6. The method for manufacturing the intermittently coupled-type optical fiber ribbon according to claim 1, further comprising:
   marking a surface of each of the optical fibers; and
   coating the plurality of marked optical fibers with the coupling resin.

7. An intermittently coupled-type optical fiber ribbon, comprising:
- a plurality of optical fibers arranged in parallel in a direction orthogonal to a longitudinal direction of the plurality of optical fibers; and
- a coupling resin coating all of the plurality of optical fibers, wherein
- slits are formed by intermittently inserting a cleaving blade into the coupling resin between some adjacent optical fibers of the plurality of optical fibers,
- an outer diameter of each of the optical fibers is 220 μm or less,
- a distance between the optical fibers into which the cleaving blade is inserted among the adjacent optical fibers is 10 μm or more and 100 μm or less, and
- a gel fraction of the coupling resin is 90% or more.

8. The intermittently coupled-type optical fiber ribbon according to claim 7, wherein
- a breaking strength of the coupling resin is 20 Mpa or more and 50 MPa or less.

9. The intermittently coupled-type optical fiber ribbon according to claim 7, wherein
- a Young's modulus of an outermost layer of each of the optical fibers is 800 MPa or more and 2000 MPa or less.

* * * * *